United States Patent
Renton et al.

(10) Patent No.: US 8,200,568 B2
(45) Date of Patent: Jun. 12, 2012

(54) SYSTEM AND METHOD FOR MANAGING TRADING ORDERS RECEIVED FROM MARKET MAKERS

(75) Inventors: Nigel J. Renton, London (GB); Michael Sweeting, Aldershot (GB)

(73) Assignee: BGC Partners, Inc., New York, NY (US)

( * ) Notice: Subject to any disclaimer, the term of this patent is extended or adjusted under 35 U.S.C. 154(b) by 1540 days.

(21) Appl. No.: 10/895,668

(22) Filed: Jul. 21, 2004

(65) Prior Publication Data

US 2006/0020536 A1    Jan. 26, 2006

(51) Int. Cl.
    *G06Q 40/00* (2012.01)
(52) U.S. Cl. ............................. 705/37; 705/35
(58) Field of Classification Search ............... 705/35–37
    See application file for complete search history.

(56) References Cited

U.S. PATENT DOCUMENTS

| | | | |
|---|---|---|---|
| 4,412,287 A | 10/1983 | Braddock, III | 364/408 |
| 5,305,200 A | 4/1994 | Hartheimer et al. | 364/408 |
| 5,727,165 A | 3/1998 | Ordish et al. | 395/237 |
| 5,809,483 A | 9/1998 | Broka et al. | 705/37 |
| 5,890,138 A | 3/1999 | Godin et al. | 705/26 |
| 5,905,974 A | 5/1999 | Fraser et al. | 705/37 |
| 5,963,923 A | 10/1999 | Garber | 705/37 |
| 6,216,114 B1 | 4/2001 | Alaia et al. | 705/37 |
| 6,493,682 B1 | 12/2002 | Horrigan et al. | 705/36 |
| 6,499,108 B1 | 12/2002 | Johnson | 713/201 |
| 6,560,580 B1 | 5/2003 | Fraser et al. | 705/37 |
| 6,598,026 B1 | 7/2003 | Ojha et al. | 705/26 |
| 6,618,707 B1 | 9/2003 | Gary | |
| 6,751,597 B1 | 6/2004 | Brodsky et al. | 705/37 |
| 7,003,483 B1 | 2/2006 | Davis | 705/36 |
| 7,076,461 B2 | 7/2006 | Balabon | 705/37 |
| 7,099,839 B2 | 8/2006 | Madoff et al. | 705/37 |

(Continued)

FOREIGN PATENT DOCUMENTS

JP    2003-076885    3/2003

(Continued)

OTHER PUBLICATIONS

Nigel J. Renton et al., "*System and Method for Managing the Execution of Trades between Market Makers*," U.S. Appl. No. 10/694,872, 52 Pages, filed Oct. 28, 2003.

(Continued)

*Primary Examiner* — Jagdish Patel
*Assistant Examiner* — Kevin Poe
(74) *Attorney, Agent, or Firm* — Ruth J. Ma

(57) ABSTRACT

According to one embodiment, a method of managing trading is provided. A first offer for a particular instrument in a particular market is received from a first market maker at a first offer price. A first bid for the same particular instrument in the same particular market is received from a second market maker at a first bid price, the first bid price being higher than or equal to the first offer price. As a result of the first bid price being higher than or equal to the first offer price, the first offer price is automatically increased to a price higher than the first bid price such that a trade is not executed between the first offer and the first bid. In some embodiments, such method may be used to protect market makers from unwanted trades caused by inherent latency in the market makers' pricing engines and/or networks.

36 Claims, 5 Drawing Sheets

U.S. PATENT DOCUMENTS

| | | | |
|---|---|---|---|
| 7,212,999 B2 * | 5/2007 | Friesen et al. | 705/37 |
| 7,246,093 B1 * | 7/2007 | Katz | 705/37 |
| 7,428,506 B2 * | 9/2008 | Waelbroeck et al. | 705/37 |
| 2001/0039527 A1 | 11/2001 | Ordish et al. | 705/37 |
| 2001/0047323 A1 | 11/2001 | Schmidt | 705/37 |
| 2001/0049651 A1 * | 12/2001 | Selleck | 705/37 |
| 2001/0056393 A1 | 12/2001 | Tilfors et al. | 705/37 |
| 2002/0010673 A1 | 1/2002 | Muller et al. | 705/37 |
| 2002/0019795 A1 | 2/2002 | Madoff et al. | 705/37 |
| 2002/0052827 A1 * | 5/2002 | Waelbroeck et al. | 705/37 |
| 2002/0077962 A1 | 6/2002 | Donato et al. | 705/37 |
| 2002/0169704 A1 | 11/2002 | Gilbert et al. | 205/37 |
| 2002/0194107 A1 | 12/2002 | Li et al. | |
| 2002/0198816 A1 | 12/2002 | Gilbert et al. | 705/37 |
| 2003/0065608 A1 | 4/2003 | Cutler | 705/37 |
| 2003/0083983 A1 | 5/2003 | Fisher et al. | 705/37 |
| 2003/0130925 A1 | 7/2003 | Malitzis | 705/37 |
| 2003/0135443 A1 | 7/2003 | Moore et al. | 705/37 |
| 2003/0140005 A1 | 7/2003 | Cole | 705/40 |
| 2004/0078317 A1 | 4/2004 | Allen et al. | 705/37 |
| 2004/0177024 A1 | 9/2004 | Bok et al. | 705/37 |
| 2004/0230520 A1 * | 11/2004 | Reding et al. | 705/37 |
| 2004/0254804 A1 * | 12/2004 | Peterffy et al. | 705/1 |
| 2005/0049956 A1 | 3/2005 | Ballman | 705/37 |
| 2005/0075965 A1 | 4/2005 | Cutler | 705/37 |
| 2005/0091142 A1 | 4/2005 | Renton et al. | 705/37 |
| 2005/0171890 A1 * | 8/2005 | Daley et al. | 705/37 |
| 2005/0187854 A1 * | 8/2005 | Cutler et al. | 705/37 |
| 2005/0228741 A1 | 10/2005 | Leibowitz | 705/37 |
| 2005/0234805 A1 | 10/2005 | Robertson et al. | 705/37 |
| 2005/0234806 A1 | 10/2005 | Findlay et al. | 705/37 |
| 2005/0240513 A1 * | 10/2005 | Merold | 705/37 |
| 2005/0256800 A1 | 11/2005 | Hogg et al. | 705/37 |
| 2005/0262003 A1 | 11/2005 | Brumfield et al. | 705/37 |
| 2006/0020536 A1 | 1/2006 | Renton et al. | 705/37 |
| 2006/0229967 A1 * | 10/2006 | Sweeting | 705/37 |

FOREIGN PATENT DOCUMENTS

| | | |
|---|---|---|
| JP | 2003-281369 | 10/2003 |
| WO | WO 01/84419 | 11/2001 |

OTHER PUBLICATIONS

Notification of Transmittal of The International Search Report, International Application No. PCT/US05/25929, 4 pages, Apr. 24, 2006.
Written Opinion of the International Searching Authority, International Application No. PCT/US05/25929, 4 pages, Apr. 24, 2006.
*United States Patent and Trademark Office*; Office Action for U.S. Appl. No. 10/694,872, filed Oct. 28, 2003 in the name of Nigel J. Renton; 57 pages, May 14, 2008.
USPTO Office Action for U.S. Appl. No. 10/694,872, Oct. 30, 2008 (15 pages).
USPTO Office Action for U.S. Appl. No. 10/694,872, Apr. 28, 2010 (11 pages).
International Search Report and Written Opinion for International Application No. PCT/US2004/035158, dated May 1, 2006 (5 pages).
International Preliminary Report on Patentability for International Application No. PCT/US2004/035158, dated Jun. 12, 2006 (4 pages).
International Preliminary Report on Patentability for International Application No. PCT/US2005/025929, dated Jan. 23, 2007 (5 pages).
Japanese Office Action with English translation for Application No. 2006-538134, dated Mar. 2, 2010 (20 pages).
Australian Examiner's Report for Application No. 2005267056, dated Apr. 1, 2010 (3 pages).
EPO Communication and extended European Search Report for Application No. 05775432.7, dated Mar. 23, 2009 (6 pages).
EPO Summons to Attend Oral Proceedings for Application No. 05775432.7, dated Feb. 22, 2010 (8 pages).
EPO Decision to Refuse for Application No. 05775432.7, dated Oct. 11, 2010 (2 pages).
EPO Brief Communication for Application No. 05775432.7, dated Oct. 11, 2010 (2 pages).
Japanese Office Action with English translation for Application No. 2006-538134, dated Oct. 19, 2010 (9 pages).
AU Examiner's Report for Application No. 200488525, dated Nov. 9, 2009 (2 pages).
Australian Examiner's Report for Application No. 2005267056, dated May 6, 2011 (1 pages).
Japanese Notice of Allowance for Application No. 2006-538134, dated Sep. 20, 2011 (3 pages).
Canadian Exam Report for Application No. 2543749, dated Jan. 18, 2012 (3 pages).
Japanese Office Action with English translation for Application No. 2007-522766, dated May 31, 2011 (8 pages).
USPTO Office Action for U.S. Appl. No. 10/694,872, Mar. 2, 2011 (33 pages).
USPTO Pre-Brief Appeal Conference Decision for U.S. Appl. No. 10/694,872, Sep. 29, 2011 (2 pages).

* cited by examiner

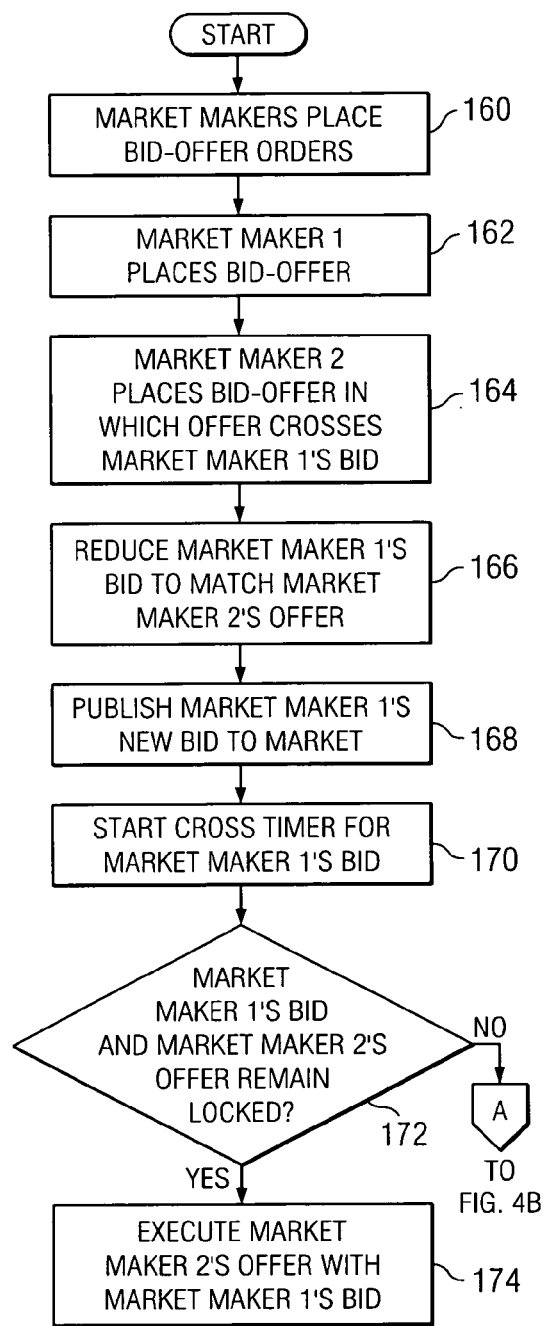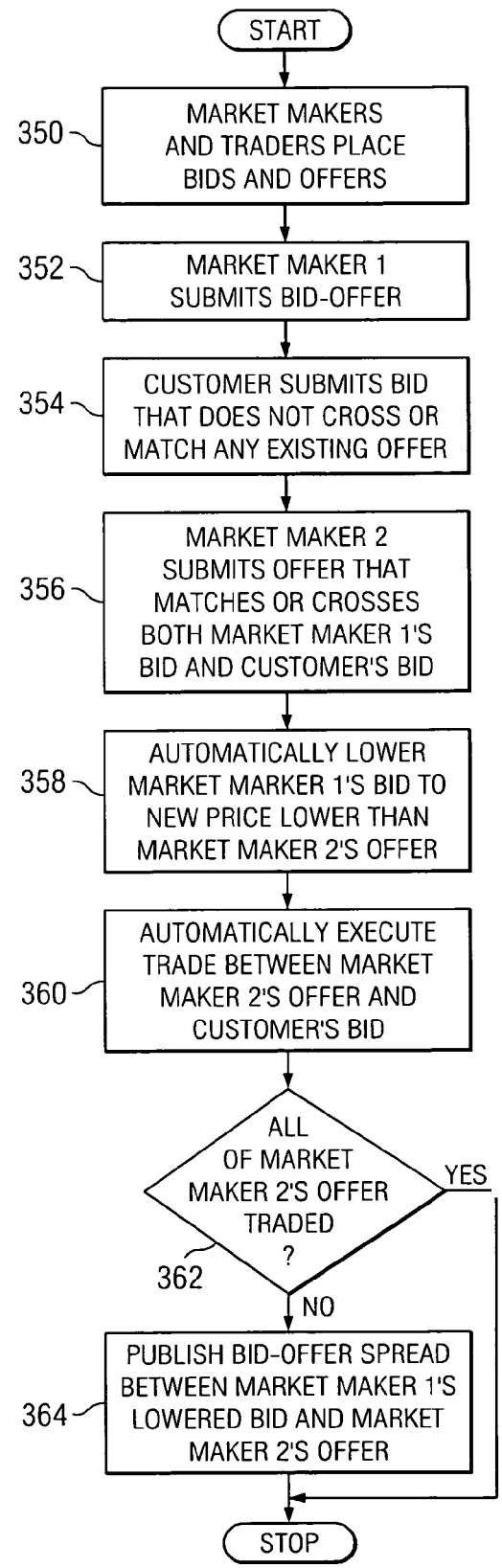
FIG. 4A
FIG. 6

SYSTEM AND METHOD FOR MANAGING TRADING ORDERS RECEIVED FROM MARKET MAKERS

TECHNICAL FIELD OF THE INVENTION

This invention relates in general to trading markets and, more particularly, to a system and method for managing the trading orders received from market makers in a trading market.

BACKGROUND OF THE INVENTION

In recent years, electronic trading systems have gained a widespread acceptance for trading items. For example, electronic trading systems have been created which facilitate the trading of financial instruments such as stocks, bonds, currency, futures, or other suitable financial instruments.

Many of these electronic trading systems use a bid/offer process in which bids and offers are submitted to the systems by a passive side then those bids and offers are hit and lifted (or taken) by an aggressive side. For example, a passive trader may submit a "bid" to buy a particular number of 30 year U.S. Treasury Bonds at a given price. In response to such a bid, an aggressive trader may submit a "hit" in order to indicate a willingness to sell bonds to the first trader at the given price. Alternatively, a passive side trader may submit an "offer" to sell a particular number of the bonds at the given price, and then the aggressive side trader may submit a "lift" (or "take") in response to the offer to indicate a willingness to buy bonds from the passive side trader at the given price. In such trading systems, the bid, the offer, the hit, and the lift (or take) may be collectively known as "orders." Thus, when a trader submits a bit, the trader is said to be submitting an order.

In many trading systems or markets, such as the NASDAQ or NYSE, for example, trading orders may be placed by both market makers and traders, or customers. A market maker is a firm, such as a brokerage or bank, that maintains a firm bid and ask (i.e., offer) price in a given security by standing ready, willing, and able to buy or sell at publicly quoted prices (which is called making a market). These firms display bid and offer prices for specific numbers of specific securities, and if these prices are met, they will immediately buy for or sell from their own accounts. A trader, or customer, is any entity other than a market maker which submits orders to a trading system.

For a "cash" price style instrument (i.e., an instrument for which the bid price is typically numerically lower than the offer price), when the price of a newly placed (aggressive) bid is greater than the price of an existing (passive) offer, a "crossed market" is created, and the bid may be referred to as a crossing bid. Similarly, when the price of newly placed (aggressive) offer is lower than the price of an existing (passive) bid, a crossed market is also created, and the offer may be referred to as a crossing offer. In many trading systems, when a bid and an offer lock (i.e., match each other) or cross, a trade is automatically executed at the price most favorable to the aggressive (i.e., the second submitted) order. For example, if a first market maker submits a bid at a price of 15, and a second market maker submits an offer of 14, a cross market is created and a trade is executed at the price of 15, which can often be a more most favorable price for the second market maker, such as where the first market maker was about to cancel his price. These systems may operate with little or no regard to the market maker committing capital to create a two-way bid and offer market price. Such market makers may have latency in their systems which may create slightly stale markets, whereby a market maker's existing price can be traded by a new market maker price that reflects a more recent market environment. In some instances, the difference may be merely milliseconds or some other very small period of time, but in a fast moving and liquid market, market makers may experience losses due the inherent latency of the relevant system.

SUMMARY OF THE INVENTION

In accordance with the present invention, systems and methods for managing trading orders received from market makers in a trading market are provided.

According to one embodiment, a method of managing trading is provided. A first offer for a first instrument is received from a first market maker at a first offer price. A first bid for the first instrument is received from a second market maker at a first bid price, the first bid price being higher than or equal to the first offer price. As a result of the first bid price being higher than or equal to the first offer price, the first offer price is automatically increased to a price higher than the first bid price such that a trade is not executed between the first offer and the first bid.

According to another embodiment, another method of managing trading is provided. A first bid for a first instrument is received from a first market maker at a first bid price. A first offer for the first instrument is received from a second market maker at a first offer price, the first offer price being lower than or equal to the first bid price. As a result of the first offer price being lower than or equal to the first bid price, the first bid price is automatically decreased to a price lower than the first offer price such that a trade is not executed between the first offer and the first bid.

According to yet another embodiment, another method of managing trading is provided. A first offer having a first offer price is received from a first market maker in a first category of market makers. A first bid having a first bid price is received from a second market maker in a second category of market makers, the first bid price being higher than or equal to the first offer price such that the first offer and first bid are either matching or crossing. If the first bid was passive and matched or crossed by the first offer, a trade is automatically executed between the first bid and the first offer. If the first offer was passive and matched or crossed by the first bid, a trade is not automatically executed between the first bid and the first offer.

According to still another embodiment, a method of managing trading is provided. A first bid for a first instrument is received from a first market maker at a first bid price. A first offer for the first instrument is received from a second market maker at a first offer price, the first offer price being lower than the first bid price. As a result of the first offer price being lower than the first bid price, the first bid price is automatically decreased to match the first offer price, and a first timer having a predetermined duration is started. If the first timer expires and both the first bid and the first offer exist at the first offer price when the first timer expires, a trade between the first bid and the first offer is automatically executed.

According to still another embodiment, another method of managing trading is provided. A first offer for a first instrument is received from a first market maker at a first offer price. A first bid for the first instrument is received from a second market maker at a first bid price, the first bid price being higher than the first offer price. As a result of the first bid price being higher than the first offer price, the first offer price is automatically increased to match the first bid price, and a first timer having a predetermined duration is started. If the first timer expires and both the first offer and the first bid exist at the first bid price when the first timer expires, a trade between the first offer and the first bid is automatically executed.

According to still another embodiment, a system for managing trading is provided. The system includes is a computer system having a processor, and a computer readable medium coupled to the computer system. The computer readable medium includes a program. When executed by the processor, the program is operable to receive a first bid for a first instrument from a first market maker at a first bid price; receive a first offer for the first instrument from a second market maker at a first offer price, the first offer price being lower than the first bid price; as a result of the first offer price being lower than the first bid price, automatically decrease the first bid price to match the first offer price; start a first timer having a predetermined duration; and if the first timer expires and both the first bid and the first offer exist at the first offer price when the first timer expires, automatically execute a trade between the first bid and the first offer.

Various embodiments of the present invention may benefit from numerous advantages. It should be noted that one or more embodiments may benefit from some, none, or all of the advantages discussed below.

One advantage of the invention is that in some embodiments, a trading system is provided in which a locked or crossed market between two market makers does not automatically trigger the execution of a trade between the two market makers. In some embodiments, a cross timer is started during which the market maker that submitted the first order (the passive order) may withdraw or move their bid or offer in order to avoid an automatically executed trade with the other market maker. This may be advantageous to market makers who desire some delay time in order to decide whether to avoid automatically executed trade with subsequent orders from other market makers. For example, in a market which receives two or more separate electronic feeds from market makers and/or customers, market makers may wish to have some time to update their bid and/or offer prices to keep up with the current market or orders from other market makers. In other embodiments, the trading system may automatically move the price of the first order (the passive order) out of the way of the second order (the aggressive order) to avoid a locked or crossed market between the two market makers. This may be advantageous to market makers who wish to avoid automatic trades with other market makers, and thus protect against any real or perceived latency in their respective pricing system's input or output.

Another advantage of the invention is that, in some embodiments, a multi-tiered system of market makers may be employed such that orders placed by different categories of market makers are treated differently by a trading system module. Thus, one category of market makers may be protected, at least to some extent, from another category of market makers that may have superior information regarding one or more instruments or access to faster pricing engines or market data input.

Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which:

FIGS. 4A-4B illustrate a method of handling a crossing offer received from a market maker assuming the bid side contains only market makers, according to one embodiment of the invention;

FIG. 6 illustrates another method of handling a crossing offer received from a market maker by moving the crossed bid to prevent a crossed or locked market according to another embodiment of the invention.

DETAILED DESCRIPTION OF THE DRAWINGS

Figure 1:
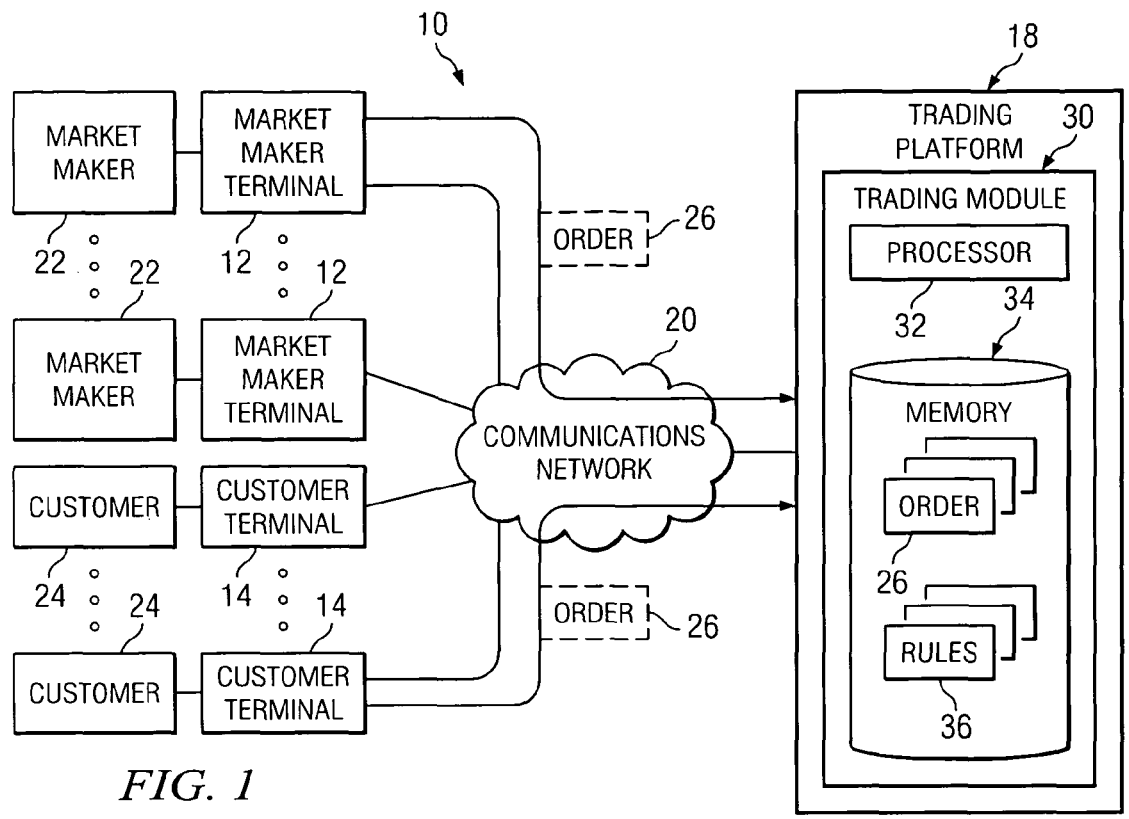
FIG. 1 illustrates an example system for managing the execution of trades between market makers in a trading market in accordance with an embodiment of the invention.

Example embodiments of the present invention and their advantages are best understood by referring now to FIGS. 1 through 6 of the drawings, in which like numerals refer to like parts.

In general, a trading system is provided which manages locked and/or crossed markets between two or more market makers. For example, in some embodiments, a locked or crossed market does not automatically trigger the execution of a trade between the two market makers. Rather, a timer may be started during which the market maker that submitted the first order (the passive order) may withdraw or move their bid or offer such that neither a locked nor crossed market exists with the second (aggressive) order, and thus a trade between the two market makers can be avoided. In particular embodiments, when a first order from a first market maker is crossed by a second order from a second market maker, the price of the first, passive order is automatically moved by the trading system to create a locked market with the second, aggressive order. If this locked market still exists when the timer expires, a trade may be automatically executed between the two market makers at the locked price, which is the price most favorable to the first, passive market maker. Thus, a market maker whose order is crossed by an order from another market maker has a period of time in which to move its order to avoid a trade being automatically executed with the other market maker. This is advantageous to market makers who do not want their orders to be automatically executed with those submitted by other market makers, which is particularly significant in markets which receive two or more separate electronic feeds from market makers and/or customers. Market makers supplying the system with bid and offer prices may wish to avoid trading with each other due to latency in their systems; instead, such market makers may wish to use their automatic pricing to attract non-automatic orders from other market participants, thus generating revenue from a volume of trades on each side of their bid-offer spreads.

In other embodiments, when a first order from a first market maker is crossed by a second order from a second market maker, the price of the first, passive order is automatically moved by the trading system to create a locked market with the second, aggressive order, but a timer may not be implemented. In such embodiments, a trade is not automatically executed between the two market makers and the market may remain locked until one of the market makers' orders is moved or removed, or some other event causes the market to become unlocked. In still other embodiments, when a first order from a first market maker is crossed by a second order from a second market maker, the price of the first, passive order is automatically moved by the trading system out of the way of the second, aggressive order to prevent a locked or crossed market between the two market makers. Thus, a timer might not be implemented in such embodiments.

In addition, in some embodiments, a multi-tiered system of market makers may be employed such that market makers are categorized into different levels or tiers that affect the way in which orders placed by such market makers are treated by trading module. For instance, an order placed by a first category of market maker that crosses a passive order placed by a second category of market maker may trigger an automatic trade, whereas an order placed by the second category of market maker that crosses a passive order placed by the first category of market maker may not trigger an automatic trade.

FIG. 1 illustrates an example trading system 10 according to an embodiment of the present invention. As shown, system 10 may include one or more market maker terminals 12 and one or more customer terminals 14 coupled to a trading platform 18 by a communications network 20.

A market maker terminal 12 may provide a market maker 22 access to engage in trading activity via trading platform 18. A market maker terminal 12 may include a computer system and appropriate software to allow market maker 22 to engage in trading activity via trading platform 18. As used in this document, the term "computer" refers to any suitable device operable to accept input, process the input according to predefined rules, and produce output, for example, a personal computer, workstation, network computer, wireless data port, wireless telephone, personal digital assistant, one or more processors within these or other devices, or any other suitable processing device. A market maker terminal 12 may include one or more human interface, such as a mouse, keyboard, or pointer, for example.

A market maker 22 may include any individual or firm that submits and/or maintains both bid and offer orders simultaneously for the same instrument. For example, a market maker 22 may include an individual or firm, such as a brokerage or bank, that maintains a firm bid and offer price in a given security by standing ready, willing, and able to buy or sell at publicly quoted prices (which is called making a market). These firms display bid and offer prices for specific numbers of specific securities, and if these prices are met, they will immediately buy for or sell from their own accounts. Many "over the counter" (OTC) stocks have more than one market maker. In some markets, market-makers generally must be ready to buy and sell at least 100 shares of a stock they make a market in. As a result, a large order from a customer, or investor, may be filled by a number of market makers at potentially different prices.

In addition, in some embodiments, market makers 22 may include individuals, firms or other entities that are granted particular privileges such that orders received from such individuals, firms or other entities are treated as being received from a traditional market maker (such as a brokerage or bank, for example). Thus, individuals, firms or other entities that are not typically categorized as market makers may be granted such market maker privileges and thus be considered as market makers 22 for the purposes of the systems and methods discussed herein. For example, certain individuals, firms or other entities that may otherwise be treated as customers 24 may be granted privileges to be treated as market makers 22 for the purposes of the systems and methods discussed herein. In some embodiments, individuals, firms or other entities that typically do not submit and/or simultaneously maintain both bid and offer orders for the same instrument may be granted market maker privileges and thus be considered as market makers 22 for the purposes of the systems and methods discussed herein. In other embodiments, individuals, firms or other entities may be required to submit and/or simultaneously maintain both bid and offer orders for particular instruments in order to be considered as market makers 22 for the purposes of the systems and methods discussed herein.

In certain embodiments, individuals, firms or other entities are charged a fee or commission or must provide other consideration in return for being granted market maker privileges. In addition, in some embodiments, an individual, firm or other entity may be designated as either a market maker 22 or a customer 24 for one or more particular instruments or types of instruments. For instance, an individual may pay a fee to be treated as a market maker 22 for one or more particular types of instruments in a market (such as particular types of instruments that the individual commonly trades), but may be treated as a customer 24 for other types of instruments in the marker.

In some embodiments, such as discussed below with reference to Rule #23, a multi-tiered system of market makers 22 may be employed. In such embodiments, market makers 22 may be categorized into different levels or tiers that affect the way in which such market makers 22 are treated by trading module 30. Each market maker 22 may be classified according to one or more criteria, such as whether the market maker 22 is an electronic feed or a human trader, and whether the market maker 22 is a strong trader, or has particular or inside information, in one or more particular instruments. In addition, in some embodiments, market makers 22 are categorized into different levels or tiers for different tradable instruments. For instance, a particular market maker 22 may be categorized as a first level market maker for instrument(s) for which that market maker 22 is a strong trader or has particular or inside information, and as a second level market maker for other types of instrument.

A customer terminal 14 may provide a customer (or investor) 24 access to engage in trading activity via trading platform 18. A customer terminal 14 may include a computer system and appropriate software to allow customer 22 to engage in trading activity via trading platform 18. A market maker terminal 12 may include one or more human interface, such as a mouse, keyboard, or pointer, for example.

A customer 24 is any entity, such as an individual, group of individuals or firm, that engages in trading activity via trading system 10 and is not a market maker 22. For example, a customer 24 may be an individual investor, a group of investors, or an institutional investor. However, as discussed above, an individual, firm, or other entity that may be otherwise categorized as a customer 24 may be granted privileges to be categorized as a market maker 22 (at least with regard to one or more types of instruments) for the purposes of the systems and methods discussed herein.

Market makers 22 and customers 24 may place various trading orders 26 via trading platform 18 to trade financial instruments, such as stocks or other equity securities, bonds, mutual funds, options, futures, derivatives, and currencies, for example. Such trading orders 26 may include bid (or buy) orders, ask or offer (or sell) orders, or both, and may be any type of order which may be managed by a trading platform 18, such as market orders, limit orders, stop loss orders, day orders, open orders, GTC ("good till cancelled") orders, "good through" orders, an "all or none" orders, or "any part" orders, for example and not by way of limitation.

Communications network 20 is a communicative platform operable to exchange data or information between trading platform 18 and both market makers 22 and customers 24. Communications network 20 represents an Internet architecture in a particular embodiment of the present invention, which provides market makers 22 and customers 24 with the ability to electronically execute trades or initiate transactions to be delivered to an authorized exchange trading floor. Alternatively, communications network 20 could be a plain old telephone system (POTS), which market makers 22 and/or customers 24 could use to perform the same operations or functions. Such transactions may be assisted by a broker associated with trading platform 18 or manually keyed into a telephone or other suitable electronic equipment in order to request that a transaction be executed. In other embodiments, communications system 14 could be any packet data network (PDN) offering a communications interface or exchange between any two nodes in system 10. Communications network 20 may alternatively be any local area network (LAN), metropolitan area network (MAN), wide area network (WAN), wireless local area network (WLAN), virtual private network (VPN), intranet, or any other appropriate architecture or system that facilitates communications in a network or telephonic environment.

Trading platform 18 is a trading architecture that facilitates the trading of trading orders 26. Trading platform 18 may be a computer, a server, a management center, a single workstation, or a headquartering office for any person, business, or entity that seeks to manage the trading of trading orders 26. Accordingly, trading platform 18 may include any suitable hardware, software, personnel, devices, components, elements, or objects that may be utilized or implemented to achieve the operations and functions of an administrative body or a supervising entity that manages or administers a trading environment.

Trading platform 18 may include a trading module 30 operable to receive trading orders 26 from market makers 22 and customers 24 and to manage or process those trading orders 26 such that financial transactions among and between market makers 22 and customers 24 may be performed. Trading module 30 may have a link or a connection to a market trading floor, or some other suitable coupling to any suitable element that allows for such transactions to be consummated.

As show in FIG. 1, trading module 30 may include a processing unit 32 and a memory unit 34. Processing unit 32 may process data associated with trading orders 26 or otherwise associated with system 10, which may include executing coded instructions that may in particular embodiments be associated with trading module 30. Memory unit 36 may store one or more trading orders 26 received from market makers 22 and/or customers 24. Memory unit 28 may also store a set of trading management rules 36. Memory unit 36 may be coupled to data processing unit 32 and may include one or more databases and other suitable memory devices, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), microcontrollers, or microprocessors.

It should be noted that the internal structure of trading module 30 may be readily changed, modified, rearranged, or reconfigured in order to perform its intended operations. Accordingly, trading module 30 may be equipped with any suitable component, device, application specific integrated circuit (ASIC), hardware, software, processor, algorithm, read only memory (ROM) element, random access memory (RAM) element, erasable programmable ROM (EPROM), electrically erasable programmable ROM (EEPROM), or any other suitable object that is operable to facilitate the operations of trading module 30. Considerable flexibility is provided by the structure of trading module 30 in the context of trading system 10. Thus, it can be easily appreciated that trading module 30 could be readily provided external to trading platform 18 such that communications involving buyer 16 and seller 18 could still be accommodated and handled properly.

In addition, it should be understood that the functionality provided by communications network 20 and/or trading module 30 may be partially or completely manual such that one or more humans may provide various functionality associated with communications network 20 or trading module 30. For example, a human agent of trading platform 18 may act as a proxy or broker for placing trading orders 26 on trading platform 18.

Trading module 30 may manage and process trading orders 26 based at least on trading management rules 36. Trading management rules 36 may include rules defining how to handle locked and crossed markets, including locked and crossed markets between two or more market makers 22. In some embodiments, trading management rules 36 generally provide that when an order is received from a second market maker 22 that matches or crosses an existing order from a first market maker 22, a trade between the two orders is not automatically executed between the two market makers 22. Instead, in the case of a crossing order, trading module 30 automatically moves the price of the first order to match the contra price of the second order to create a locked market between the two market makers 22. (A contra price for a bid is an offer price, while a contra price for an offer is a bid price.) In addition, in the case of either a matching or crossing order by the second market maker 22, a cross timer is started. If the locked market still exists between the two market makers 22 when the timer expires, trading module 30 automatically executes a trade between the two market makers 22 at the locked price, which is the price most favorable to the first, passive market maker 22. Thus, if a market maker 22 has an existing, passive order that is crossed by an order from another market maker 22, the first market maker 22 has a period of time in which to move its order to avoid a trade being automatically executed with the other market maker 22, which may be particularly advantageous in fast-moving markets.

In various embodiments, trading management rules 36 may include one, some or all of the following rules:

1. When a new price (i.e., a bid or offer price) is entered by a market maker that would cross an existing price placed by a customer, or vice versa, a trade may be executed to avoid a crossed market.

2. In certain embodiments, when a new price (i.e., a bid or offer price) is entered by a first market maker that would cross a contra price previously placed by a second market maker: (1) the price entered by one of the market makers is automatically moved to match the price entered by the other maker to create a locked market, and (2) a cross timer (which may also be referred to as an auto-execute timer) is implemented. In a particular embodiment, the price entered by the second market maker is moved to match the price entered by the first market maker to create a locked market. If the locked market exists between the two market makers at the expiration of the cross timer, a trade may be auto-executed between the two market makers at the locked price.

As discussed above, for a "cash" price style instrument (i.e., an instrument for which the bid price is typically numerically lower than the offer price), a newly entered bid price crosses an existing offer price if the bid price is greater than the offer price, while a newly entered offer price crosses an existing bid price if the offer price is less than the bid price. For example, suppose a first market maker places a bid-offer of 23-25 and a second market maker subsequently places a bid-offer of 20-21. The offer price submitted by the second market maker (21) is less than the bid price previously submitted by the first market maker (23), and thus the second market maker's offer price crosses the first market maker's bid price. As a result, the first market maker's bid price may be moved to 21 to match the newly submitted offer price (such that the first market maker's bid-offer now stands at 21-25) to avoid a crossed market between the first market maker and the second market maker, and a cross timer may be implemented.

3. In certain other embodiments, when a new price (i.e., a bid or offer price) is entered by a first market maker that would cross a contra price previously placed by a second market maker: (1) the price entered by one of the market makers is automatically moved to match the price entered by the other market maker to create a locked market, but (2) a cross timer is not implemented. In such embodiments, the locked market may remain locked until one or the market makers moves their price, a customer trades on the locked price, or some other event causes the locked market to become unlocked.

4. In still other embodiments, when a new price (i.e., a bid or offer price) is entered by a first market maker that would cross a contra price previously placed by a second market maker: (1) the price entered by one of the market makers is automatically moved such that neither a crossed market nor a locked market exists, and (2) as a result of neither a crossed market nor a locked market existing, a trade is not executed between the two market makers. For example, if the first market maker entered a bid that would cross an offer previously entered by a second market maker, the price of the second market maker's offer may be moved to a new price higher than the first market maker's bid such that trade is not executed between the two market makers. Similarly, if the first market maker entered an offer that would cross a bid previously entered by a second market maker, the price of the second market maker's bid may be moved to a new price lower than the first market maker's offer such that trade is not executed between the two market makers. In such embodiments, a cross timer may not be implemented as there is no crossed or locked market between the two market makers.

In some embodiments in which crossed prices are moved to prevent crossed or locked markets between market makers 22, crossed prices may be moved to a price that is one or more price ticks (or in some cases, one or more integers or fractions of an integer) away from the crossing price. For example, in a market with a tick size of ¼ point, if a newly placed bid of 18½ crosses an existing offer of 18¼, the offer may be automatically moved to 18¾, one price tick above the aggressive bid.

In some embodiments, crossed prices may be moved to a price that is slightly less than one price tick (or in some cases, one integer) away from the crossing price. For example, in a market with a price tick size of 1 point, if a newly placed bid of 20 crosses an existing offer of 19, the offer may be automatically moved to 20.90 (rather than 21). In this regard, in some embodiments, trading module 30 may employ any of the techniques or concepts disclosed in U.S. patent application Ser. No. 10/171,009 filed on Jun. 11, 2002 and entitled "Systems and Methods for Providing Price Improvement in Active Trading Market."

5. In still other embodiments, when a new price (i.e., a bid or offer price) is entered by a first market maker that would cross a contra price previously placed by a second market maker: (1) the price entered by the first market maker is placed on the market at that price, thus creating an inverted (or crossed) market, and (2) a cross timer is implemented. If the inverted market exists between the two market makers at the expiration of the cross timer, a trade may be auto-executed between the two market makers at the price entered by the first market maker, the price entered by the second market maker, or some price in between the two. In some embodiments, trading platform 18 may display such crossed markets to customers. For example, if a first market maker places a bid-offer price spread of 12-14 and a second market maker places a bid-offer price spread of 15-17, a crossed market bid-offer price spread of 15-14 may be displayed to customers. This display may be attractive for anyone trading on the instrument, and may in some trading systems even provide customers 24 possible arbitrage situations in which a customer 24 may realize a profit by quickly trading on both sides of the bid-offer price spread.

6. In certain embodiments, when a new price (i.e., a bid or offer price) is entered by one market maker that matches a contra price previously placed by another market maker, a locked market is created, and as a result, a cross timer may be implemented. As discussed above, if the locked market exists at the expiration of the cross timer, a trade may be auto-executed between the two market makers at the locked price.

7. In certain other embodiments, when a new price (i.e., a bid or offer price) is entered by one market maker that matches a contra price previously placed by another market maker, one of the prices is automatically moved such that neither a crossed market nor a locked market exists. For example, if a bid is received from a first market that matches a previously placed offer from a second market maker, the price of the second market maker's offer may be moved to a new price higher than the first market maker's bid such that trade is not executed between the two market makers. Similarly, if an offer is received from a first market that matches a previously placed bid from a second market maker, the price of the second market maker's bid may be moved to a new price lower than the first market maker's offer such that trade is not executed between the two market makers. In such embodiments, a cross timer may not be implemented as there is no crossed or locked market between the two market makers.

8. In some embodiments, trading platform 18 prevents displaying crossed markets to customers. For example, if a crossing bid or offer is received, trading platform 18 may not display the crossing bid or offer until a trade is executed (such as when an order submitted by a trader crosses an order submitted from a market maker) or the crossed bid or offer is moved to create a locked market with the crossing bid or offer (such as when an order submitted by one market maker crosses an order submitted from another market maker). In some embodiments in which inverted (or crossed) markets are permitted, trading platform 18 may display inverted markets to customers (see Rule #4 above).

9. In some embodiments, auto-execute may be enabled. If auto-execute is enabled, crossed markets trigger an automatic trade, except crossed markets between market makers, which trigger various other rules discussed herein.

10. In some embodiments in which a crossing price is automatically moved to create a locked market (for example, see Rule #2 above), when a new price (a bid or offer price) is submitted by a second market maker that would cross a contra price previously placed by a first market maker, only the first market maker's price on the crossed side is moved to lock (i.e., match) the price newly entered by second market maker. The price submitted by the second market maker that would cross the contra price previously placed by a first market maker may be referred to as the "crossing price."

(a) If only bids from market makers exist on the new locking side, an auto-execute timer may be started in order to delay the auto-execution.

(b) If a customer's price exists before the crossing price is received from the second market maker and the customer's price locks with the crossing price, a trade may be executed without delay (in other words, without being delayed by a timer) between the customer and the second market maker at the locked price against everyone else, including the first market maker.

(c) If a customer's price exists before the crossing price is received from the second market maker and the customer's price doesn't lock (i.e., is inverted) with the crossing price, an auto-execute timer may not be started, but the crossing price (the aggressive price) may be promoted to the customer's price and a trade may be auto-executed against the customer's price only on the passive side at the original passive price. For example, suppose a first market maker submits a bid at 18, then a customer submits a bid at 18, and then a second market maker submits an offer at 17. The first market maker's bid may be moved to 17 and a trade may be auto-executed between the customers bid and the second market makers offer at the price of 18, all without a cross timer being started.

11. In some embodiments, there can be only one outstanding auto-execute timer per instrument. In other embodiments, there may be more than one outstanding auto-execute timer for a particular instrument.

12. As discussed above, an auto-execute timer may be implemented in a locked market. In addition (or alternatively), in some embodiments, an auto-execute timer may be implemented in an inverted (or crossed) market (for example, see Rule #4 above).

13. The auto-execute timer may be cancelled if the locked market is removed, such as when one of the prices underlying the locked/choice market is moved such that neither a locked market nor a crossed market exists.

14. After the auto-execute timer elapses, the system may execute aggressively on behalf of the market maker crossing. In other words, the system may auto-execute a trade between the first market maker and the second market maker.

15. In some embodiments, if after a locked market is created between two market makers (such as due to the circumstances discussed in Rule #2, Rule #3, or Rule #6, for example), a customer's price is subsequently entered at the locked level, the system may auto-execute a trade against everyone (including market makers) on the passive side at that locked price.

In addition, in some embodiments, if a portion of the market maker's order that was auto-executed with the customer remains after the trade with the customer, any pending auto-execute timer (if any) between the two market makers may be cancelled and a trade auto-executed between the two market makers. In a particular embodiment, the customer's order that catalyzed this trade will trade first before the trade between the market makers. For example, suppose a locked market between a first market maker's bid and a second market maker's offer at the price of 15, wherein the size of each of the lock bid and offer orders is 10,000. Thus, the locked market may be expressed as 15-15(10,000×10,000). If a customer enters an offer of size 3,000 at price 15, a trade of size 3,000 may be auto-executed between the customer's offer (at price 15) and the first market maker's bid (at price 15). Thus, the existing locked market may be expressed as 15-15(7,000×10,000). As discussed above, as a result of the auto-executed trade between the customer and the first market maker, any pending auto-execute timer (if any) between the first and second market makers may be cancelled and a trade auto-executed between the second marker maker's offer and the remaining portion of the first market maker's bid (i.e., a trade of size 7,000 is auto-executed).

In other embodiments, if a portion of the market maker's order that was auto-executed with the customer remains after the trade with the customer, any pending auto-execute timer (if any) between the two market makers may remain in progress (or in some embodiments, is restarted). If the locked market exists between the two market makers at the expiration of the cross timer, a trade may then be auto-executed between the two market makers at the locked price. Alternatively, in an embodiment in which a timer is not implemented for a locked market (for example, see Rule #6), the locked market between the two market makers may remain locked until one or the market makers moves their price, a customer trades on the locked price, or some other event causes the locked market to become unlocked.

16. In some embodiments, any new crossing price from a market maker will cancel any pending auto-execute timer, and start a new auto-execute timer.

17. In some embodiments, customer and market maker prices entered at the trading price during a trade may be elevated to aggressive buy or sell orders, and join in the trade.

18. In some embodiments, a trade (buy or sell) between a customer and a market maker that would naturally take place may cancel any pending auto-execute timer. For example, suppose a first market maker submits a bid-offer order at 18-20, and a second market maker submits a bid-offer order at 15-17. The first market maker's bid may be automatically reduced to 17 to match the second market maker's offer (according to Rule #1), which creates a locked market at 17, and a cross-timer may be implemented. If before the cross-timer has expired, a customer submits a bid at 18 (which would naturally trigger a trade between the customer and the second market maker), the cross-timer may be cancelled and a trade auto-executed between the customer and the second market maker at the locked price of 17.

19. In some embodiments, the sequencing of existing orders may be maintained during a market maker price movement (either up or down) as a result of crossed markets. If two or more existing market maker same-side prices are to be moved and re-entered due to a crossing contra price received from another market maker, each of the existing market maker orders is moved in price order, and then in time order (for orders at the same price). Each newly moved market maker order may then be given a new timestamp as it is moved to keep the previous order sequence. Existing customer limit orders may not be pushed down a bid or offer sequence in favor of a newly moved market maker order, by virtue of their older timestamps keeping them in front of any market maker prices newly moved to the same price level. Newly moved market maker orders may alternatively be re-ordered as they are moved (with the most aggressive market maker order—e.g., the highest bid or the lowest offer for a normally-priced instrument such as a stock—receiving its new timestamp first), and placed below any orders existing already at the price to which the newly moved market maker were moved.

20. Since market makers may believe they are, or intend to be, always passive, market maker API accounts may be set up such that the brokerage fees for all market maker transactions (both passive and aggressive) are the same.

21. In some embodiments, the cross timer may be dynamically adjustable to account for market volatility.

22. The length of the cross timer used for different instruments may differ, and may be based on one or more parameters associated with the instrument, such as the volatility, current price, or average trading volume associated with that instrument, for example. In some embodiments, trading module 30 may determine an appropriate length for cross timers for different instruments based on such parameters. In addition, the cross timer for each instrument may be independently adjusted. For example, trading module 30 may increase the length of the cross timer for a particularly volatile instrument automatically in response to data regarding the volatility of the instrument, or in response to feedback from market makers 22 wishing to increase the delay for adjusting their trading orders 26 for that instrument.

23. As discussed above, in some embodiments, a multi-tiered system of market makers 22 is employed. In such embodiments, market makers 22 are categorized into different levels or tiers that affect the way in which such market makers 22 are treated by trading module 30. Each market maker 22 may be classified according to one or more criteria, such as whether the market maker 22 is an electronic feed or a human trader, and whether the market maker 22 is a strong trader, or has particular or superior information pertaining to the trading flows of one or more particular instruments. In some embodiments, market makers 22 are categorized into different levels or tiers for different tradable instruments.

In multi-tiered embodiments, trading management rules 36 may be designed to protect particular categories of market makers 22 from other categories of market makers 22. For example, rules 36 may be designed to protect electronic feed market makers 22 or other market makers 22 not regarded as having superior information on a particular instrument from market makers 22 that are regarded as having access to superior information regarding the particular instrument.

In a particular embodiment, there are two levels of market makers 22: (1) electronic market makers (MMe) and (2) manual market makers (MMm). In some embodiments, MMe's may include electronic feeds, MMm's may include traders for a market maker firm having exposure to particular information or trading flows in one or more particular instruments, and customers 24 may include non-market maker (customer) traders. Each market maker 22 may be classified either an MMe or an MMm for different types of instruments. In one embodiment, if a market maker 22 is a strong trader, or is known to often have superior information, in one or more particular instruments, that market maker 22 is classified as an MMm in such instrument(s) and as an MMe in all other instruments. For instance, a Canadian bank may be classified as an MMm for any instrument based on the Canadian dollar or its exchange rate, and classified as an MMe for all other instruments.

In this particular embodiment, in a market of a particular instrument, rules 36 protect MMe's for that instrument from MMm's for that instrument. In particular, the following rules may apply:

(A) If an MMm's price matches or crosses an existing MMe price, one or more of the various rules discussed above may apply to prevent an auto-executed trade between the MMm and MMe. For example, if an aggressive (e.g., newly placed or moved) MMm price matches or crosses a passive (e.g., previously existing) MMe's price, one of (although not limited to) the following rules may be triggered:

(i) if the MMs's price crosses the existing MMe price, the crossed MMe price may be moved to match the MMm price, a cross timer is started, and a trade is auto-executed between the MMe and the MMm only if the locked market between MMe and MMm remains locked when the cross timer expires (for example, see Rule #2);

(ii) if the MMs's price crosses the existing MMe price, the crossed MMe price may be moved to match the MMm price, no cross timer is started, and the market between the MMe and the MMm remains locked until the MMe or the MMm moves their price, the locked market gets traded on by another trader, or some other event occurs that unlocks the market between MMe and MMm (for example, see Rule #3);

(iii) if the MMs's price matches or crosses the existing MMe price, the matched or crossed MMe price may be moved out of the way of the MMm price such that there is no locked or crossed market between the MMe and the MMm, and no cross timer is implemented (for example, see Rule #4); or (iv) if the MMs's price matches or crosses the existing MMe price, the MMm's matching or crossing price may be placed on the market, thus creating a locked market or an inverted (or crossed) market between the MMm and the MMe, whereby a cross timer is started, and a trade is auto-executed between the MMe and the MMm only if the MMe and the MMm provided market remains locked or inverted when the cross timer expires (for example, see Rule #5).

In this manner, trading module 30 may protect MMe prices from being "run over" by MMm's that have inside or superior information regarding trading flows of particular instruments.

(B) If a second MMm's price matches or crosses an first MMm's previously existing price, the second MMm's price may be treated as a passive customer's price and thus a trade may be auto-executed between the first and second MMm's (without a cross timer being implemented).

(C) If an MMe's price matches or crosses an existing MMm price, the MMm price may be treated as a passive customer's price and thus a trade may be auto-executed between the MMe and MMm (without a cross timer being implemented). In other words, the system assumes that when an MMe price crosses an existing MMm price, the MMm wants to make the trade at that price and thus the MMm need not be protected (e.g., by using a cross timer or other techniques discussed above) against an auto-executed trade.

(D) If a second MMe's price matches or crosses a first MMe's previously existing price, one or more of the various rules discussed above (for example, rules (i)-(iv) discussed above) may be triggered to prevent an auto-executed trade between the two MMe prices.

To illustrate the operation of this particular embodiment, a few examples are presented as follows.

Example 1

MMm Price Crosses an Existing MMe Price (System Configured to Automatically Move Crossed Prices to Create a Locked Market with the Crossing Price—see Rule #2 Above)

a) $MMe_1$ enters bid-offer spread: 10-12 (10×10)
b) $MMe_2$ enters bid-offer spread: 10-12 (5×5)
System will display: 10-12 (15×15)
c) MMm enters bid: 20- (10×)
System will display: 20-20 (10×15) and cross timer started 10- (15×)

Result: if MMm's and MMe's prices remain locked when the cross timer expires, the system would be configured to auto-execute a trade between MMm and MMe$_1$ at 20 (size=10).

Example 2

MMe Price Crosses an Existing MMm Price (System Configured to Automatically Move Crossed Prices to Create a Locked Market with the Crossing Price—see Rule #2 Above)
   a) MMe enters bid-offer spread: 10-12 (10×10)
   System configured to display: 10-12 (10×10)
   b) MMm enters bid: 08- (10×)
   c) Same MMe re-enters new bid-offer spread: 06-08 (10×10)
Result: system would be configured to auto-execute a trade between MMm and MMe at 08 (size=10), without implementing a cross timer.

Example 3

MMe Crosses an Existing MMm (System Configured to Automatically Move Crossed Prices to Create a Locked Market with the Crossing Price—see Rule #2 Above)
   a) MMe enters bid-offer spread: 10-12 (10×10)
   b) MMm enters bid: 11- (5×)
   System configured to display: 11-12 (15×10)
   c) Same MMe re-enters new bid-offer spread: 06-08 (10×10)
Result: system would be configured to auto-execute a trade between MMm and MMe at 11 (size=5), without implementing a cross timer.

Example 4

MMm Price Crosses an Existing MMe Price (System Configured to Automatically Move Crossed Prices to Create a Locked Market with the Crossing Price—see Rule #2 Above)
   a) MMe$_1$ enters bid-offer spread: 10-12 (10×10)
   b) MMe$_2$ enters bid-offer spread: 07-09 (10×10)
   System configured to display: 09-09 (10×10)
      07-12 (10×10)
   c) MMm enters offer: -07 (x×5)
   System configured to display: 07-07 (15×5) and timer started
      -09(×10)
      -12(×10)
Result: if MMm's and MMe$_1$'s prices remain locked when the cross timer expires, the system would be configured to auto-execute a trade between MMm and MMe$_1$ at 07 (size=5).

Example 5

MMm Price Crosses an Existing MMe Price (System Configured to Automatically Move Crossed Prices Out of the Way to Avoid a Crossed or Locked Market—see Rule #4 Above)
   a) MMe$_1$ enters bid-offer spread: 10-12 (10×10)
   b) MMe$_2$ enters bid-offer spread: 10-12 (5×5)
   System will display: 10-12 (15×15)
   c) MMm enters bid: 20- (10×)
   System configured to display: 20-21 (10×15), no cross timer started
      10- (15×)

It should be understood that in any such embodiments that employ a multi-tiered system of market makers 22, any one or more other trading management rules 36 previously discussed (in any combination) make also apply in order for trading module 30 to manage trading orders 26 received from various market makers 22 and/or customers 24.

It should also be understood that set of trading management rules 36 listed above apply to particular embodiments and that in various embodiments, the trading management rules 36 applied by trading module 30 may include any number of the rules listed above, additional rules (one or more of which may be alternatives or modifications of any of the rules listed above), or any combination thereof. For example, in a particular embodiment, the set of trading management rules 36 applied by trading module 30 includes Rules #1, #2, #6, #8, #9, #10, #13, #14, #15, #18, #21 and #22. In another example, embodiment, the set of trading management rules 36 applied by trading module 30 includes Rules #1, #4, #7, #8, #9, #19, #20 and #23.

In addition, it should be understood that in some embodiments, the trading management rules 36 applied by trading module 30 may be equally or similarly applied to numerically-inverted instruments in which bids are higher in price (although lower in value) than corresponding offers. For example, bonds (such as US Treasury "when-issued" bills, for example) are typically numerically-inverted instruments because bond prices are typically inversely related to bond yields. In other words, the going bid price of a bond is numerically higher than the going offer price for the bond.

Figure 2:
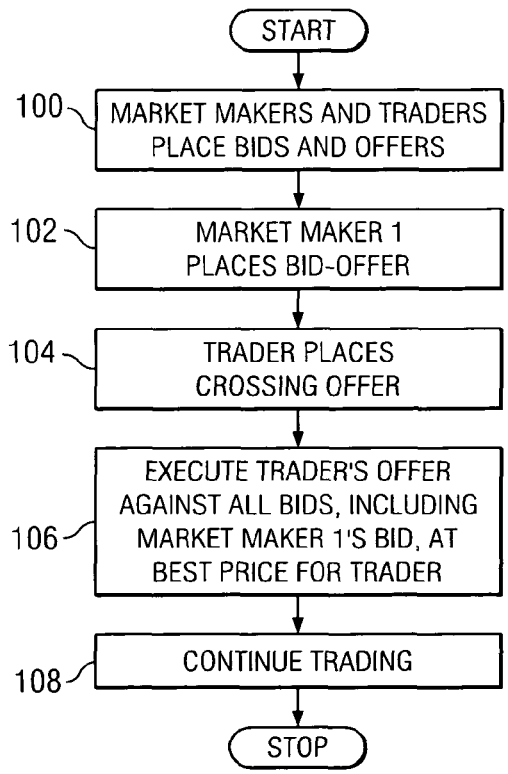
FIG. 2 illustrates a method of handling a crossing offer received from a customer according to one embodiment of the invention.

FIGS. 2 through 6 illustrate example methods for handling trading orders in a variety of situations using trading system 10, including applying various trading management rules 36 discussed above. FIG. 2 illustrates a method of handling a crossing offer received from a customer 24 according to one embodiment of the invention. At step 100, various orders 22, including bid and offer (or ask) orders, are received for a particular instrument 24, thus establishing a market for that instrument 24. Such orders 22 may be received by both market makers 22 and customers 24. At step 102, a first market maker 22, MM1, submits a bid-offer price spread for instrument 24 to trading platform 18. At step 104, a customer 24 places an offer order which crosses the bid price submitted by MM1. At step 106, trading module 30 auto-executes the customer's 28 offer against all existing bids, including MM1's bid, at the best price for the customer 24. At step 108, trading may continue. It should be understood that the method of FIG. 2 may be similarly applied to handle a crossing bid received from a customer 24, such as where a customer 24 places an bid order which crosses the offer price submitted by a market maker 22.

To better understand the method shown in FIG. 2, suppose MM1 submits a bid-offer price spread of 12-14 (of sizes 5 by 5) for a stock at step 102. At step 104, a customer places an offer order at a price of 11 (of size 5) for the stock, which crosses the bid price (12) submitted by MM1. At step 106, trading module 30 auto-executes the customer's offer against all existing bids, including MM1's bid of 12, at the best price for the customer. Assuming MM1's bid of 12 is the highest existing bid for the stock, trading module 30 auto-executes a trade of 5 shares between the customer and MM1 at a price of 12.

Figure 3:
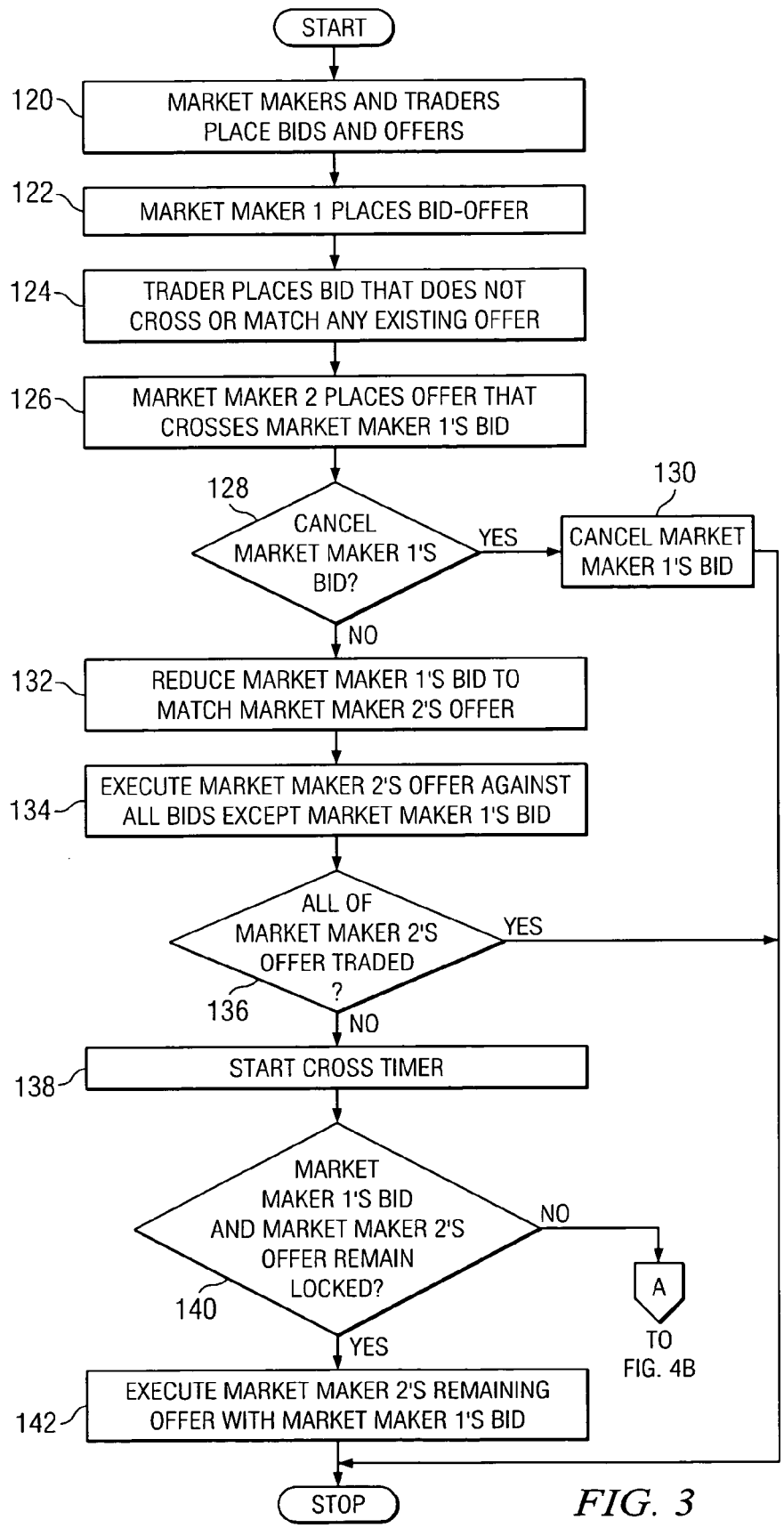
FIG. 3 illustrates a method of handling a crossing offer received from a market maker assuming the bid side contains both market makers and customers, according to one embodiment of the invention.

FIG. 3 illustrates a method of handling a crossing offer received from a market maker 22 assuming the bid side contains both market makers 22 and customers 24, according to one embodiment of the invention. At step 120, various orders 22, including bid and offer orders, are received for a particular instrument 24, thus establishing a market for that instrument 24. Such orders 22 may be received by both market makers 22 and customers 24. At step 122, a first market maker 22, MM1, submits a bid-offer price spread for instrument 24 to trading platform 18. At step 124, a customer 24 places a bid for instrument 24 that does not cross or match any current offer, and thus does not trigger a trade. At step 126, a second market maker 22, MM2, submits a bid-offer price spread for instrument 24 including an offer which crosses MM1's bid price.

At step 128, trading module 30 determines whether to cancel MM1's bid. In one embodiment, trading module 30 cancels MM1's bid if (a) the bid is not a limit bid and (b) moving the bid to match MM2's offer price would move the bid below another existing bid. If trading module 30 determines to cancel MM1's bid, the bid is cancelled at step 130. Alternatively, if trading module 30 determines not to cancel MM1's bid, MM1's bid is moved to match MM2's offer price at step 132 to prevent a cross market between MM1 and MM2. At step 134, trading module 30 auto-executes MM2's offer against all existing bids, excluding MM1's moved bid, at the best price for MM2. MM2's offer may be auto-executed against customers' bids, as well as bids received from market makers if (a) MM2's offer matched the price of such market maker bids and (b) customers' bids are also present.

At step 136, it is determined whether all of MM2's offer was traded at step 134. If so, the method stops. However, if any portion of MM2's offer remains after the executed trade(s) at step 134, a cross timer starts for MM1's moved bid at step 138. At step 140, the cross timer runs. If MM1's moved bid and the remaining portion of MM2's offer remain locked when the cross timer expires, the remaining portion of MM2's offer is auto-executed with MM1's moved bid at step 142. Alternatively, any of a variety of events may cause the locked relationship between MM1's moved bid and MM2's offer to terminate before the cross timer expires, such as MM1 moving its bid price, MM2 moving its offer, MM2's offer being matched and executed by another bid, or MM1's bid or MM2's offer being withdrawn, for example. Such situations are discussed in more detail below with reference to FIG. 4. It should be understood that the method of FIG. 3 may be similarly applied to handle a crossing bid received from a market maker 22, such as where a market maker 22 places an bid order which crosses the offer price previously submitted by another market maker 22.

To better understand the method shown in FIG. 3, suppose MM1 submits a bid-offer price spread of 35-37 (of sizes 5 by 10) for a stock at step 122. At step 124, a customer places a bid order for the stock at a price of 35 (of size 5) that does not cross or match any current offer, and thus does not trigger a trade. At step 126, MM2 submits a bid-offer price spread of 32-33 (of sizes 8 by 10) for the stock. MM2's offer price of 33 crosses MM1's bid price of 35.

Assume that at step 128, trading module 30 determines not to cancel MM1's bid. Thus, at step 132, MM1's bid is reduced from 35 to 33 to match MM2's offer price of 33. At step 134, trading module 30 auto-executes MM2's offer at 33 against all existing bids, excluding MM1's moved bid, at the best price for MM2. Assuming that the customer's bid at 35 is the highest existing bid price, trading module 30 auto-executes a trade at a price of 35 between 5 of the 10 shares offered by MM2's offer and the bid for 5 shares by the customer. MM2's existing bid-offer now reads 32-33 (of sizes 8 by 5). At step 136, it is determined that a portion of MM2's offer—namely, 5 shares—remains after the executed trade at step 134, and thus a cross timer starts for MM1's moved bid (price=33) at step 138. At step 140, the cross timer runs. If MM1's moved bid (price=33) and the remaining portion of MM2's offer (price=33) remain locked when the cross timer expires, the remaining 5 shares of MM2's offer is auto-executed with the 5 shares of MM1's moved bid at the price of 33 at step 142. Alternatively, if the locked relationship between MM1's moved bid and MM2's offer terminated before the cross timer expired, various consequences may occur, as discussed in more detail below with reference to FIG. 4B.

Figure 4B:
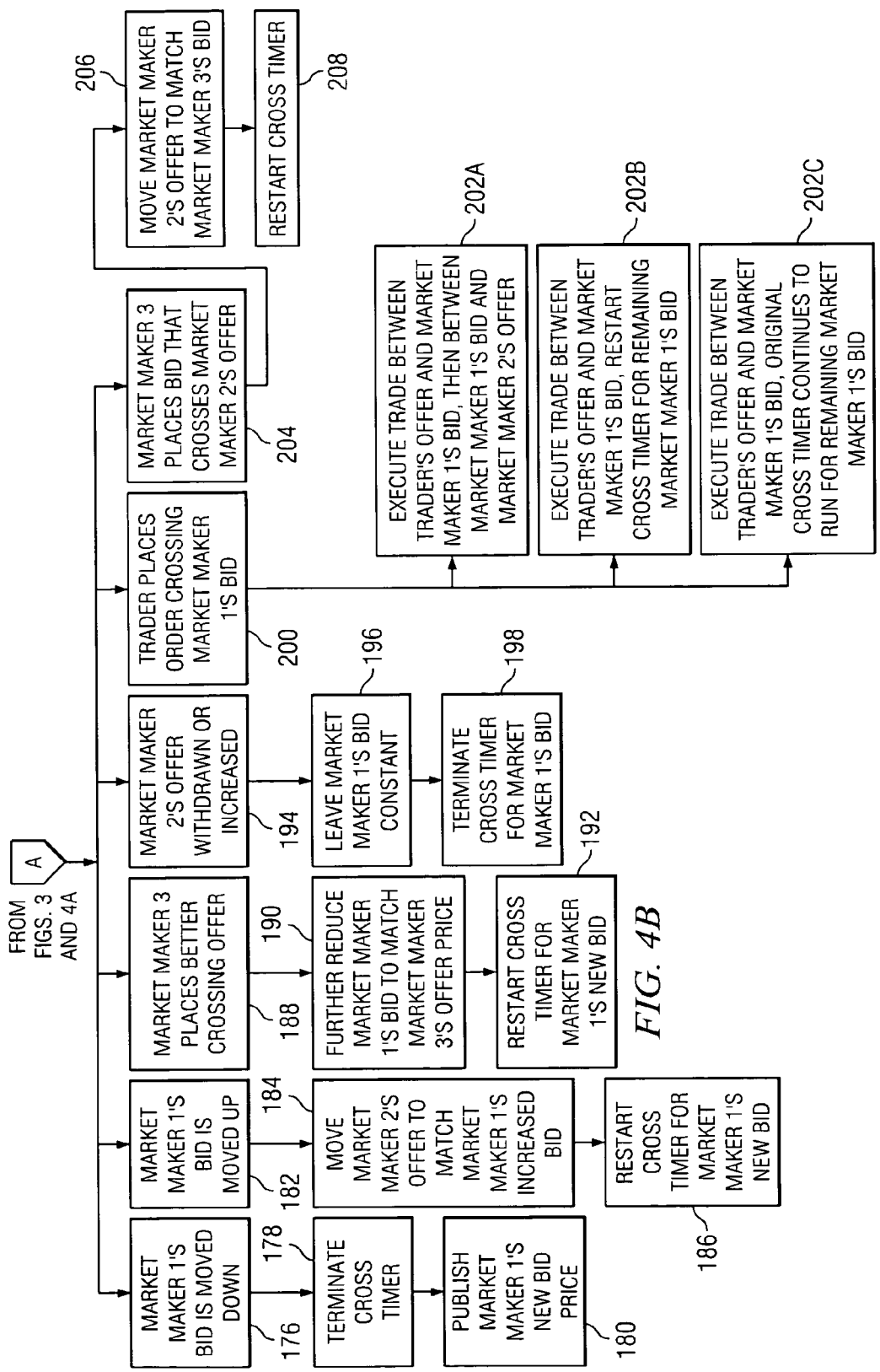

FIGS. 4A-4B illustrate a method of handling a crossing offer received from a market maker 22 assuming the bid side contains only market makers 22, according to one embodiment of the invention. As shown in FIG. 4A, at step 160, various orders 22, including bid and offer orders, are received from one or more market makers 22 for a particular instrument 24, thus establishing a market for that instrument 24. At step 162, a first market maker 22, MM1, submits a bid-offer price spread for instrument 24 to trading platform 18. At step 164, a second market maker 22, MM2, submits a bid-offer price spread for instrument 24 including an offer which crosses MM1's bid price. At step 166, trading module 30 moves MM1's bid price to match MM2's offer price to prevent a cross market between MM1 and MM2. At step 168, trading module 30 publishes MM1's newly moved bid in the market data. Thus, trading module 30 may avoid publishing a crossed market. At step 170, trading module 30 starts a cross timer for MM1's newly moved bid.

At step 172, the cross timer runs. For the duration of the cross timer, MM1's bid can only be traded against an offer from a customer, not another market maker, including MM2. If MM1's moved bid and the remaining portion of MM2's offer remain locked when the cross timer expires, MM2's offer is auto-executed with MM1's moved bid at step 174. Alternatively, any of a variety of events may cause the locked relationship between MM1's moved bid and MM2's offer to terminate before the cross timer expires, such as MM1 moving its bid price, MM2 moving its offer, MM2's offer being matched and executed by another bid, or MM1's bid or MM2's offer being withdrawn, for example. Such situations are shown in FIG. 4B and discussed below with reference to steps 176 through 204.

First, suppose MM1's bid is moved down (either by MM1 or otherwise) during the duration of the cross timer at step 176 such that MM1's bid and MM2's offer are neither crossed nor locked. In response, the cross timer is terminated at step 178 and the new bid price is published to the market at 180.

Second, suppose MM1's bid is moved up (either by MM1 or otherwise) during the duration of the cross timer (such as during re-aging) at step 182. In response, trading module 30 moves MM2's offer to match MM1's newly increased bid at step 184, and the cross timer is restarted for MM1's bid at this new locked price at step 186. Thus, the method may return to step 172.

Third, suppose a third market maker 22, MM3, submits a better crossing offer than MM2's offer during the duration of the cross timer at step 188. In other words, MM3's offer is at a lower price than MM2's offer. In response to MM3's offer, trading module 30 further reduces MM1's bid to match MM3's offer price at step 190, and cancel the running cross timer and start a new cross timer for MM1's newly reduced bid at step 192. Thus, the method may return to step 172.

Fourth, suppose at step 194, MM2 withdraws it's crossing offer which was placed at step 164, or amends the offer to a higher price, during the duration of the cross timer. In response, MM1's bid remains constant at step 196, and the cross timer for MM1's bid is terminated at step 198. A "normal" (i.e., not crossed or locked) bid-offer state now exists.

Fifth, suppose at step 200, a customer 24 submits an offer that crosses MM1's bid, or moves an existing offer to a price that crosses MM1's bid, during the duration of the cross timer. This situation may be handled in several different ways, depending on the particular embodiment. In one embodiment, shown at step 202A, trading module 30 first executes a trade between the customer's offer and MM1's bid at the locked price, and then executes a trade between remaining shares (if any) of MM1's bid and MM2's offer at the locked price without waiting for the cross timer to expire.

In another embodiment, shown at step 202B, trading module 30 executes a trade between the customer's offer and MM1's bid and restarts the cross timer for any remaining shares of MM1's bid, if any. Thus, the method may return to step 172. In yet another embodiment, shown at step 202C, trading module 30 executes a trade between the customer's offer and MM1's and the cross timer for any remaining shares of MM1's bid, if any, continues to run (i.e., the cross timer is not reset).

Sixth, suppose at step 204, a third market maker 22, MM3, submits a bid during the duration of the cross timer that crosses (i.e., is higher than) the locked price of MM1's bid and MM2's offer. In response, trading module 30 moves MM2's offer to match MM3's bid price at step 206, and restarts a cross timer for MM2's offer at step 208.

As discussed with regard to the methods of FIGS. 2 and 3, it should be understood that the method of FIG. 4 may be similarly applied whether the crossing order is a bid or an offer. In particular, the method of FIG. 4 may be similarly applied to handle a crossing bid received from a market maker 22 where the offer side contains only market makers 22.

To better understand the method shown in FIG. 4, suppose MM1 submits a bid-offer price spread of 12-14 (of sizes 10 by 10) for a stock at step 162. At step 164, MM2 submits a bid-offer price spread of 9-11 (of sizes 5 by 5) for the stock. MM2's offer price of 11 thus crosses MM1's bid price of 12. At step 166, trading module 30 moves MM1's bid price from 12 to 11 to match MM2's offer price to prevent a cross market between MM1 and MM2. At step 168, trading module 30 starts a cross timer for MM1's bid at the price of 11. At step 170, trading module 30 publishes MM1's newly moved bid such that the published bid-offer spread is 11-11.

At step 172, the cross timer runs. If MM1's moved bid and the remaining portion of MM2's offer remain locked when the cross timer expires, MM2's offer is traded with MM1's moved bid at the price of 11 at step 174. Alternatively, as discussed above, any of a variety of events may cause the locked relationship between MM1's moved bid and MM2's offer to terminate before the cross timer expires.

First, suppose MM1 moves its bid price down from 11 to 10 at step 176 such that MM1's bid (at 10) and MM2's offer (at 11) are no longer crossed nor locked. In response, the cross timer is terminated at step 178 and MM1's new bid price of 10 is published to the market at step 180.

Second, suppose MM1's bid price is moved up from 11 to 12 at step 182. In response, trading module 30 moves MM2's offer price from 11 to 12 to match MM1's newly increased bid at step 184, and the cross timer is restarted at this new locked price at step 186. Thus, the method may return to step 172.

Third, suppose at step 188, MM3 submits a crossing offer at the price of 10, which betters MM2's offer at 11. In response, trading module 30 reduces MM1's bid from 11 to 10 to match MM3's offer price at step 190. Trading module 30 then cancels the running cross timer and starts a new cross timer for MM1's newly reduced bid at the price of 10 at step 192. Thus, the method may return to step 172.

Fourth, suppose at step 194, MM2 withdraws it's crossing offer (at the price of 11) which was placed at step 164, or amends the offer from 11 to 12. In response, MM1's bid remains constant at 11 at step 196, and the cross timer for MM1's bid is terminated at step 198. A "normal" (i.e., not crossed or locked) bid-offer state now exists.

Fifth, suppose at step 200, a customer 24 submits an offer of 5 shares at the price of 9, which crosses MM1's bid at 11. As discussed above, this situation may be handled differently depending on the particular embodiment. In the embodiment shown at step 202A, trading module 30 first executes a trade between the 5 shares of the customer's offer and 5 of the 10 shares of MM 1's bid at the locked price of 11, and then executes a trade between the remaining 5 shares of MM1's bid and the 5 shares of MM2's offer at the locked price of 11 without waiting for the cross timer to expire. In the embodiment shown at step 202B, trading module 30 executes a trade between the 5 shares of the customer's offer and 5 of the 10 shares of MM1's bid at the locked price of 11, and resets the cross timer for the remaining 5 shares of MM1's bid. In the embodiment shown at step 202C, trading module 30 executes a trade between the 5 shares of the customer's offer and 5 of the 10 shares of MM1's bid at the locked price of 11, and the cross timer for MM1's bid continues to run for the remaining 5 shares of MM1's bid.

Sixth, suppose at step 204, MM3 submits a bid at the price of 12, which crosses (i.e., is higher than) the locked price of MM1's bid and MM2's offer at 11. In response, trading module 30 moves MM2's offer (as well as any other market maker offers at the locked price) to 12 to match MM3's bid price at step 206, and restarts a cross timer for MM2's offer at step 208.

Figure 5:
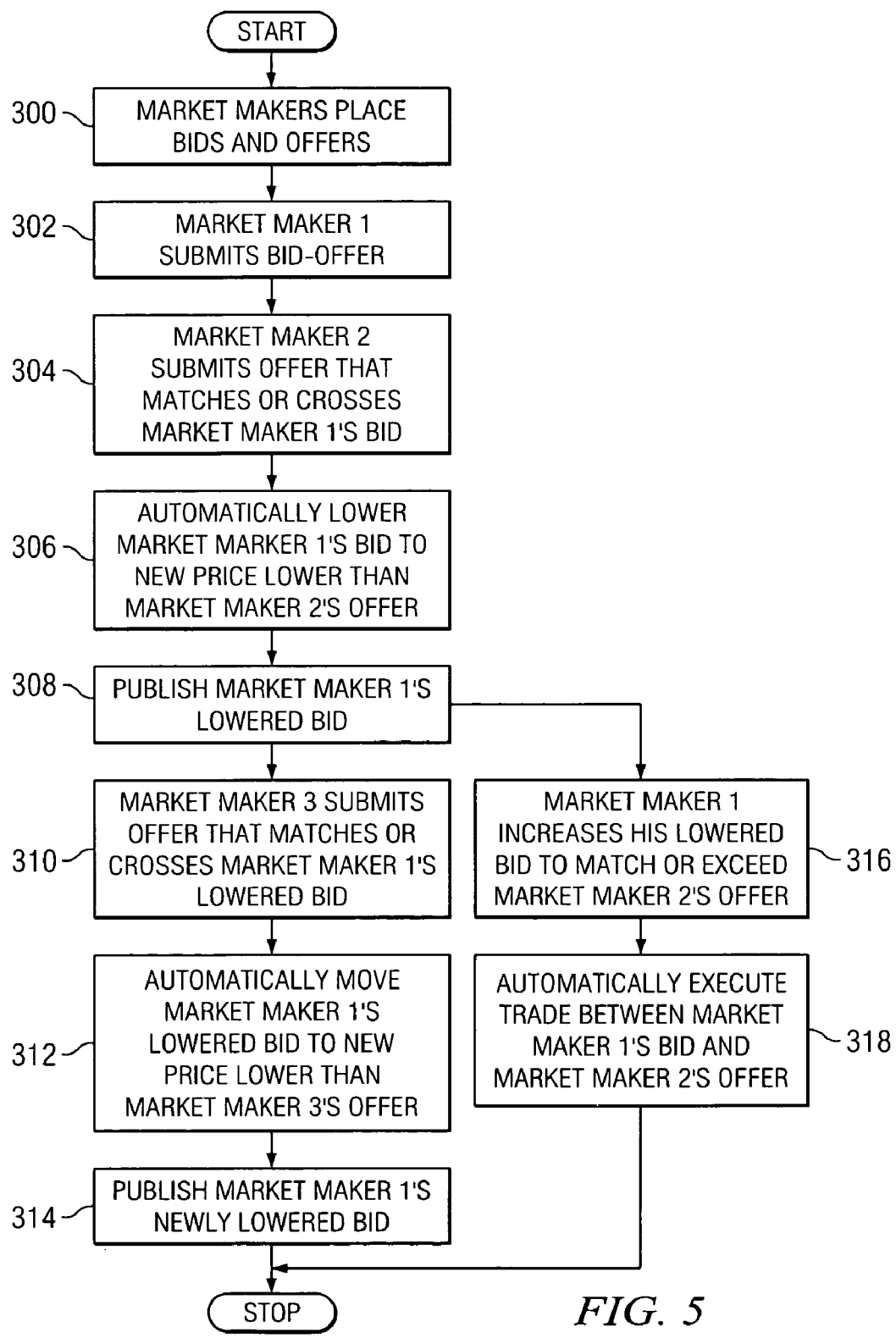
FIG. 5 illustrates a method of handling a crossing offer received from a market maker by moving the crossed bid to prevent a crossed or locked market according to one embodiment of the invention.

FIG. 5 illustrates a method of handling a crossing offer received from a market maker 22 by moving the crossed bid received from another market maker 22 to prevent a crossed or locked market according to another embodiment of the invention. At step 300, various orders 22, including bid and offer orders, are received from one or more market makers 22 for a particular instrument 24, thus establishing a market for that instrument 24. At step 302, a first market maker 22, MM1, submits a bid-offer price spread for instrument 24 to trading platform 18. At step 304, a second market maker 22, MM2, submits a bid-offer price spread for instrument 24 including an offer which matches or crosses MM1's bid price. At step 306, trading module 30 automatically moves MM1's bid price to a new price lower than MM2's offer price to prevent a locked or crossed market between MM1 and MM2. At step 308, trading module 30 publishes MM1's newly moved bid in the market data. Since MM1's bid price is moved such that there is no locked or crossed market between MM1 and MM2, trading module 30 does not start a cross timer for MM1 and MM2.

Any of a variety of events may occur next. For example, at step 310, a third market maker 22, MM3, submits a bid-offer price spread for instrument 24 including an offer which matches or crosses MM1's previously-lowered bid price. At step 312, trading module 30 may automatically move MM1's previously-lowered bid price to a new price lower than MM3's offer price to prevent a locked or crossed market between MM1 and MM3. At step 314, trading module 30 publishes MM1's newly moved bid in the market data.

As another example, at step 316, MM1 moves his lowered bid price to match (or exceed) MM2's offer price to create a locked or crossed market. At step 318, as a result of MM1 moving his lowered bid price to match (or exceed) MM2's offer price, trading module 30 may automatically execute a trade between MM1 and MM2 at MM2's offer price.

As discussed with regard to the methods of FIGS. 2-4, it should be understood that the method of FIG. 5 may be similarly applied whether the crossing order is a bid or an offer. In particular, the method of FIG. 5 may be similarly applied to handle a crossing bid received from a market maker 22.

To better understand the method shown in FIG. 5, suppose MM1 submits a bid-offer price spread of 12-14 (of sizes 10 by 10) for a stock at step 302. At step 304, MM2 submits a bid-offer price spread of 8-11 (of sizes 5 by 5) for the stock. MM2's offer price of 11 thus crosses MM1's bid price of 12. At step 306, trading module 30 automatically moves MM1's bid price from 12 to 10 (or some other price lower than 11, which price may or may not be a whole number) to prevent a locked or crossed market between MM1 and MM2. At step 308, trading module 30 publishes MM1's newly moved bid such that the published bid-offer spread is 10-11.

At step 310, a third market maker 22, MM3, submits a bid-offer price spread of 7-9 (of sizes 5 by 5) for the stock instrument. MM3's offer price of 9 thus crosses MM1's previously-reduced bid price of 10. At step 312, trading module 30 automatically moves MM1's previously-reduced bid price from 10 to 8 (or some other price lower than 9, which price may or may not be a whole number) to prevent a locked or crossed market between MM1 and MM3. At step 314, trading module 30 publishes MM1's newly moved bid such that the published bid-offer spread is 9-11.

At step 316, MM1 moves his lowered bid price of 10 back to 11 to match MM2's offer price of 11. As a result, at step 318, trading module 30 may automatically execute a trade between MM1 and MM2 at the price of 11.

FIG. 6 illustrates another method of handling a crossing offer received from a market maker 22 by moving the crossed bid received from another market maker 22 according to another embodiment of the invention. At step 350, various orders 22, including bid and offer orders, are received from one or more market makers 22 and/or customers 24 for a particular instrument 24, thus establishing a market for that instrument 24. At step 352, a first market maker 22, MM1, submits a bid-offer price spread for instrument 24 to trading platform 18. At step 354, a customer 24 submits a bid order for instrument 24 to trading platform 18 that does not cross or match any existing offers on the trading platform 18. For example, customer's bid price may be lower than or equal to the bid price of MM1's bid-offer price spread. At step 356, a second market maker 22, MM2, submits a bid-offer price spread for instrument 24 including an offer price which matches or crosses both (a) MM1's bid price and (b) the customer's bid price.

At step 358, as a result of MM2's offer price matching or crossing MM1's bid price, trading module 30 automatically moves MM1's bid price to a new price lower than MM2's offer price to prevent a locked or cross market between MM1 and MM2. However, although MM2's offer price matches or crosses the customer's bid price, trading module 30 does not move the customer's bid price. At step 360, since MM2's offer and the customer's bid are locked or crossed, trading module 30 may auto-execute a trade between MM2's offer and the customer's bid.

At step 362, it is determined whether all of MM2's offer was traded at step 360. If so, the method stops. However, if any portion of MM2's offer remains after the executed trade with the customer's bid at step 360, at step 364, trading module 30 may publish a bid-offer spread between the MM1's lowered bid price and the offer price for the remaining portion of MM2's offer and trading may continue.

As discussed with regard to the methods of FIGS. 2-5, it should be understood that the method of FIG. 6 may be similarly applied whether the crossing order is a bid or an offer. In particular, the method of FIG. 6 may be similarly applied to handle a crossing bid received from a market maker 22.

To better understand the method shown in FIG. 6, suppose MM1 submits a bid-offer price spread of 12-14 (of sizes 10 by 10) for a stock at step 352. At step 354, customer 24 submits a bid price of 11 (of size 5) for the stock. At step 356, MM2 submits a bid-offer price spread of 8-11 (of sizes 10 by 10) for the stock. MM2's offer price of 11 thus crosses MM1's bid price of 12 and matches the customer's bid price of 11. At step 358, as a result of MM2's offer price of 11 crossing MM1's bid price of 12, trading module 30 automatically moves MM1's bid price from 12 to 10 to prevent a locked or cross market between MM1 and MM2. However, although MM2's offer price of 11 matches the customer's bid price of 11, trading module 30 does not move the customer's bid price. At step 360, trading module 30 may auto-execute a trade of 5 shares between MM2's offer and the customer's bid at the price of 15.

At step 362, it is determined that 5 shares of MM2's offer remain untraded after the trade was executed at step 360. Thus, at step 364, trading module 30 may publish a bid-offer spread between the MM1's lowered bid price of 10 (10 shares) and the offer price 11 for the remaining portion of MM2's offer (5 shares) and trading may continue. Thus, trading module 30 may publish a bid-offer price spread of 10-11 (of sizes 10 by 5) and trading may continue.

Modifications, additions, or omissions may be made to any of the methods discussed above (including those discussed with reference to FIGS. 2-6) without departing from the scope of the invention. Additionally, steps may be performed in any suitable order without departing from the scope of the invention.

Although an embodiment of the invention and its advantages are described in detail, a person skilled in the art could make various alterations, additions, and omissions without departing from the spirit and scope of the present invention as defined by the appended claims.

What is claimed is:

1. A method comprising:
receiving, from a first market maker on a first remote device, a first order for a financial instrument;
receiving, after a latent period of time, from a second market maker on a second remote device, a second order that matches the first order;
determining, via a computing device that is in communication over a network with the first remote device and the second remote device, in accordance to a predetermined set of rules that a match between the first order and the second order should be avoided; and
adjusting, via the computing device in response to the determination that the match should be avoided, a price of the first order in order to avoid executing a trade between the first order and the second order.

2. The method of claim 1, in which the act of determining that the match should be avoided further comprises:
determining that the second order price offers a bid price that is higher than or equal to an offer price of the first order.

3. The method of claim 2, in which the act of adjusting the price of the first order further comprises:
increasing the offer price of the first order to be higher than the bid price of the second order.

4. The method of claim 1, in which the act of determining that the match should be avoided further comprises:
determining, that due to the latent period of time, the price of the first order and a price of the second order no longer reflect recent market conditions.

5. The method of claim 1, in which the act of determining that the match should be avoided further comprises:
   determining that the second order offers an offer price that is lower than or equal to a bid price of the first order.

6. The method of claim 5, in which the act of adjusting the price of the first order further comprises:
   decreasing the bid price of the first order to be lower than the offer price of the second order.

7. The method of claim 1, in which the act of determining that the match should be avoided further comprises:
   determining that the second market maker belongs to a first category; and
   decreasing any orders submitted by a market maker of the first category that triggers the act of adjusting the price of the first order.

8. The method of claim 1, in which the first category comprises market makers that are electronic feeds.

9. The method of claim 1 further comprising:
   receiving, from a third market maker, a third order that matches the first order.

10. The method of 9 further comprising:
    determining that the third market maker belongs to a second category; and
    executing a trade between the first order and the third order.

11. The method of claim 10, in which the second category comprises market makers that are human traders.

12. The method of claim 9 further comprising:
    in response to receiving the third order, starting a timer for a predetermined amount of time; and
    receiving, before the predetermined amount of time has expired, a request from the first market maker to adjust the price of the first order in order to avoid executing a trade between the first order and the third order.

13. An apparatus comprising:
    a processor; and
    a memory, in which the memory stores instructions which, when executed by the processor, direct the processor to
    receive, from a first market maker on a first remote device, a first order for a financial instrument;
    receive, after a latent period of time, from a second market maker on a second remote device, a second order that matches the first order;
    determine, in accordance to a predetermined set of rules that a match between the first order and the second order should be avoided; and
    adjust, in response to the determination that the match should be avoided, a price of the first order in order to avoid executing a trade between the first order and the second order.

14. The apparatus of claim 13, in which the memory further stores instructions which, when executed by the processor, direct the processor to:
    determine that the second order price offers a bid price that is higher than or equal to an offer price of the first order.

15. The apparatus of claim 14, in which the memory further stores instructions which, when executed by the processor, direct the processor to:
    increase the offer price of the first order to be higher than the bid price of-the second order.

16. The apparatus of claim 15, in which the memory further stores instructions which, when executed by the processor, direct the processor to:
    determine, that due to the latent period of time, the price of the first order and a price of the second order no longer reflect recent market conditions.

17. The apparatus of claim 13, in which the memory further stores instructions which, when executed by the processor, direct the processor to:
    determine that the second order offers an offer price that is lower than or equal to a bid price of the first order.

18. The apparatus of claim 13, in which the memory further stores instructions which, when executed by the processor, direct the processor to:
    decrease the bid price of the first order to be lower than the offer price of the second order.

19. The apparatus of claim 18, in which the memory further stores instructions which, when executed by the processor, direct the processor to:
    determine that the second market maker belongs to a first category; and
    decrease any orders submitted by a market maker of the first category that triggers the act of adjusting the price of the first order.

20. The apparatus of claim 13, in which the first category comprises market makers that are electronic feeds.

21. The apparatus of claim 13, in which the memory further stores instructions which, when executed by the processor, direct the processor to:
    receive, from a third market maker, a third order that matches the first order.

22. The apparatus of claim 13, in which the memory further stores instructions which, when executed by the processor, direct the processor to:
    determine that the third market maker belongs to a second category; and
    execute a trade between the first order and the third order.

23. The apparatus of claim 22, in which the second category comprises market makers that are human traders.

24. The apparatus of claim 13, in which the memory further stores instructions which, when executed by the processor, direct the processor to:
    in response to receiving the third order, start a timer for a predetermined amount of time; and
    receive, before the predetermined amount of time has expired, a request from the first market maker to adjust the price of the first order in order to avoid executing a trade between the first order and the third order.

25. An article of manufacture comprising:
    a storage medium that is tangible and non-transitory, in which the storage medium stores instructions which, when executed by a processor, direct the processor to:
    receive, from a first market maker on a first remote device, a first order for a financial instrument;
    receive, after a latent period of time, from a second market maker on a second remote device, a second order that matches the first order;
    determine, in accordance to a predetermined set of rules that a match between the first order and the second order should be avoided; and
    adjust, in response to the determination that the match should be avoided, a price of the first order in order to avoid executing a trade between the first order and the second order.

26. The article of manufacture of claim 25, in which the storage medium further stores instructions which, when executed by the processor, direct the processor to:
    determine that the second order price offers a bid price that is higher than or equal to an offer price of the first order.

27. The article of manufacture of claim 26, in which the storage medium further stores instructions which, when executed by the processor, direct the processor to:
    increase the offer price of the first order to be higher than the bid price of-the second order.

28. The article of manufacture of claim 27, in which the storage medium further stores instructions which, when executed by the processor, direct the processor to:
    determine, that due to the latent period of time, the price of the first order and a price of the second order no longer reflect recent market conditions.

29. The article of manufacture of claim 25, in which the storage medium further stores instructions which, when executed by the processor, direct the processor to:
  determine that the second order offers an offer price that is lower than or equal to a bid price of the first order.

30. The article of manufacture of claim 25, in which the storage medium further stores instructions which, when executed by the processor, direct the processor to:
  decrease the bid price of the first order to be lower than the offer price of the second order.

31. The article of manufacture of claim 30, in which the storage medium further stores instructions which, when executed by the processor, direct the processor to:
  determine that the second market maker belongs to a first category; and
  decrease any orders submitted by a market maker of the first category that triggers the act of adjusting the price of the first order.

32. The article of manufacture of claim 25, in which the first category comprises market makers that are electronic feeds.

33. The article of manufacture of claim 13, in which the storage medium further stores instructions which, when executed by the processor, direct the processor to:
  receive, from a third market maker, a third order that matches the first order.

34. The article of manufacture of claim 33, in which the storage medium further stores instructions which, when executed by the processor, direct the processor to:
  determine that the third market maker belongs to a second category; and
  execute a trade between the first order and the third order.

35. The article of manufacture of claim 34, in which the second category comprises market makers that are human traders.

36. The article of manufacture of claim 33, in which the storage medium further stores instructions which, when executed by the processor, direct the processor to:
  in response to receiving the third order, start a timer for a predetermined amount of time; and
  receive, before the predetermined amount of time has expired, a request from the first market maker to adjust the price of the first order in order to avoid executing a trade between the first order and the third order.

* * * * *